(12) United States Patent
Masters

(10) Patent No.: US 8,615,010 B1
(45) Date of Patent: *Dec. 24, 2013

(54) SYSTEM AND METHOD FOR MANAGING TRAFFIC TO A PROBE

(75) Inventor: Richard Roderick Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/372,927

(22) Filed: Feb. 18, 2009

Related U.S. Application Data

(62) Division of application No. 10/444,279, filed on May 23, 2003, now Pat. No. 7,710,867.

(51) Int. Cl.
*H04J 1/16* (2006.01)
*H04L 12/28* (2006.01)

(52) U.S. Cl.
USPC .......................................................... 370/390

(58) Field of Classification Search
None
See application file for complete search history.

(56) References Cited

U.S. PATENT DOCUMENTS

| | | | |
|---|---|---|---|
| 5,610,905 A * | 3/1997 | Murthy et al. | 370/401 |
| 5,898,837 A | 4/1999 | Guttman et al. | |
| 5,963,540 A | 10/1999 | Bhaskaran | |
| 6,266,335 B1 | 7/2001 | Bhaskaran | |
| 6,601,084 B1 | 7/2003 | Bhaskaran et al. | |
| 6,742,045 B1 * | 5/2004 | Albert et al. | 709/238 |
| 6,772,226 B1 | 8/2004 | Bommareddy et al. | |
| 6,779,039 B1 | 8/2004 | Bommareddy et al. | |
| 6,853,642 B1 * | 2/2005 | Sitaraman et al. | 370/395.4 |
| 6,880,089 B1 | 4/2005 | Bommareddy et al. | |
| 6,895,443 B2 | 5/2005 | Aiken | |
| 6,934,260 B1 | 8/2005 | Kanuri | |
| 7,023,804 B1 | 4/2006 | Younes et al. | |
| 7,047,315 B1 | 5/2006 | Srivastava | |
| 7,055,173 B1 * | 5/2006 | Chaganty et al. | 726/11 |
| 2001/0049741 A1 | 12/2001 | Skene et al. | |
| 2002/0126671 A1 | 9/2002 | Ellis et al. | |
| 2003/0043755 A1 | 3/2003 | Mitchell | |
| 2003/0204728 A1 * | 10/2003 | Irwin | 713/176 |
| 2003/0223413 A1 | 12/2003 | Guerrero | |
| 2004/0030927 A1 * | 2/2004 | Zuk | 713/201 |

OTHER PUBLICATIONS

"Ethereal—Interactively browse network traffic," ethereal.com, 29 pages, www.ethereal.com/docs/man-pages/ethereal.1.html (accessed Apr. 15, 2004).
"Tethereal—Dump and analyze network traffic," ethereal.com, 11 pages, www.ethereal.com/docs/man-pages/tethereal.1.html (accessed Apr. 15, 2004).
"Editcap—Edit and/or translate the format of capture files," ethereal. com, 3 pages, www.ethereal.com/docs/nnan-pages/editcap.1.html (accessed Apr. 15, 2004).
"Network Sniffer," linuxmigration.com, 4 pages, www.linuxmigration.com/quickref/admin/ethereal.html (accessed Apr. 15, 2004).
"FAQ: Network Intrusion Detection Systems," robertgraham.com, Mar. 21, 2000, www.robertgraham.com/pubs/network-intrusion-detection.html (accessed Apr. 15, 2004).

* cited by examiner

*Primary Examiner* — Chirag Shah
*Assistant Examiner* — Srinivasa Reddivalam
(74) *Attorney, Agent, or Firm* — Frommer Lawrence & Haug LLP; John W. Branch

(57) ABSTRACT

A system and method is directed to routing a packet over a network to a probe. The system includes a replicator and a distributor. The replicator receives a packet from a client and replicates the packet. The distributor is either out-of-band or in-band to a flow of traffic between the client and a server. In the out-of-band configuration, the distributor forwards the replicate packet to at least one probe in a plurality of probes. The distributor receives a response to the replicate packet and transforms a source MAC address in the response to a MAC address of the distributor. The distributor forwards the transformed packet. The replicator forwards the original packet. In the in-band configuration, the distributor selects and forwards the original packet to a server using a first forwarding mechanism, and selects and forwards the replicate packet to a probe using a second forwarding mechanism.

31 Claims, 9 Drawing Sheets

SYSTEM AND METHOD FOR MANAGING TRAFFIC TO A PROBE

CROSS REFERENCE TO RELATED APPLICATIONS

This application is a Divisional patent application of U.S. patent application Ser. No. 10/444,279, filed May 23, 2003, the benefit of which is hereby claimed under 35 U.S.C. §120 (e), and further which is incorporated herein by reference.

FIELD OF THE INVENTION

The present invention relates to computer network traffic, and in particular to managing network traffic to a probe.

BACKGROUND OF THE INVENTION

The Internet has become increasingly complex, leaving many businesses vulnerable to malicious attacks. Every year, network security breaches cost businesses millions of dollars. Many businesses have responded to these threats by enhancing network security, through the use of firewalls. However, this relatively narrow response has proven insufficient. For example, a firewall may not adequately protect the business from email attacks, viruses, and other intrusions by unauthorized users.

Therefore, some businesses have attempted to further protect their computer systems, and content, by increasing the number and variety of network security tools, beyond firewalls. Such tools may include anti-viral probes, email scanners, network sniffers, local area network (LAN) analyzers, encryption tools, and intrusion detection systems.

However, such network security tools often require access to the network traffic of the business to probe for the presence of a security threat. As the number and types of network security tools grow within the business, throughput of the network traffic may decrease to an unacceptable level. Moreover, such growth of network security tools may strain many existing security architectures. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

Figure 1:
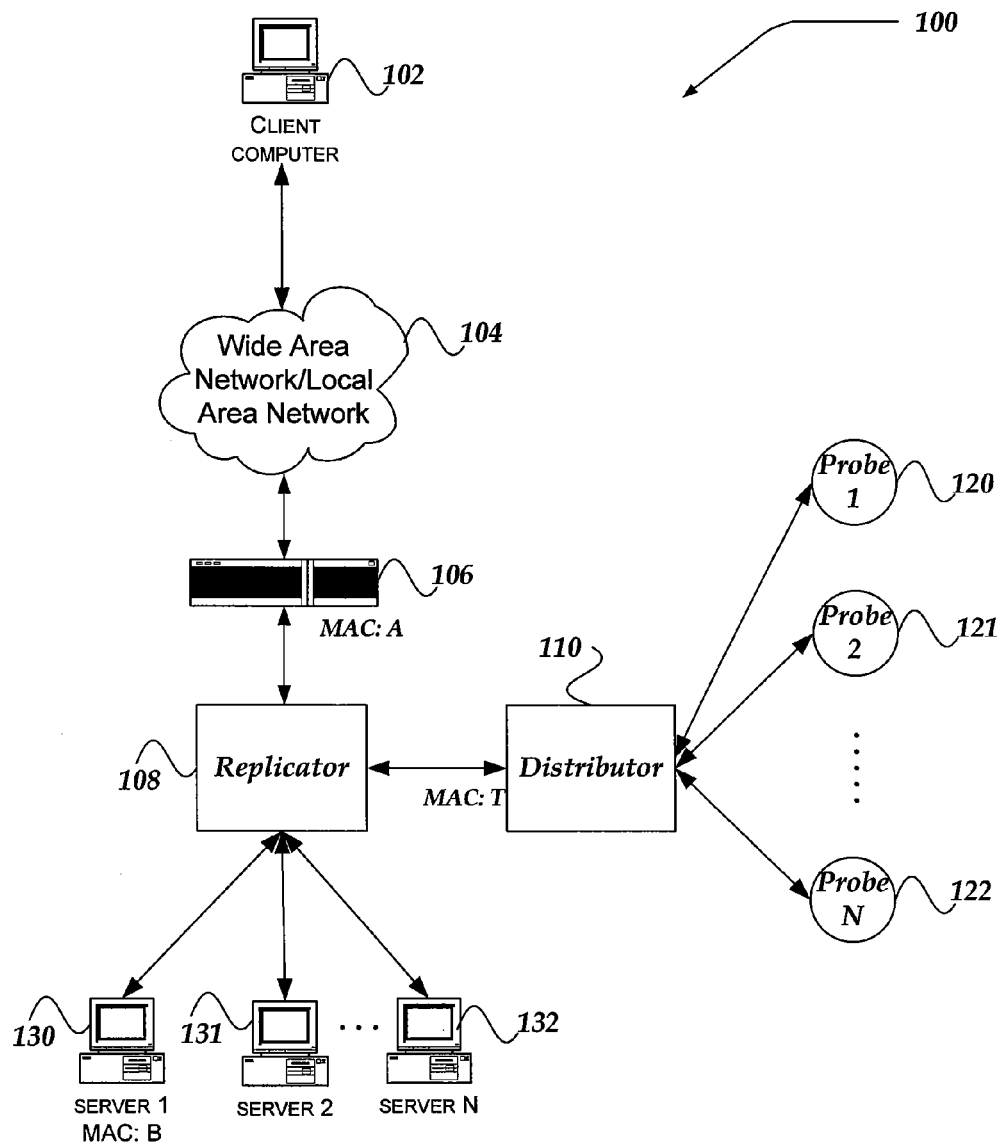
FIG. 1 illustrates an exemplary environment in which an out-of-band distributor operates for managing traffic to a plurality of probes.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" include plural references. The meaning of "in" includes "in" and "on."

The meaning of "media access control (MAC) address," and "MAC address" includes, but is not limited to, a link-layer address as identified by the Open Systems Interconnection (OSI) reference model for networking. Link-layer addresses may also be known as layer 2 addresses, physical addresses, hardware addresses, and the like. Typically, most end components in a network infrastructure include a physical network connection and therefore a single MAC address. Components in a network infrastructure that interconnect network segments may include multiple MAC addresses.

Briefly stated, the present invention is directed to a system, apparatus, and method for routing a packet over a network to a probe. The system includes a replication component and a distribution component. The replication component is configured to receive a packet and to replicate the packet. The distribution component is configured to receive the replicate packet. In one embodiment, the distribution component operates out-of-band from a typical flow of network traffic communicated between a client and a server. In another embodiment, the distribution component is integrated with the replication component, such that it is in-band to the typical flow of network traffic communicated between the client and the server.

In the out-of-band configuration, the replication component provides the replicate packet to the distribution component. The replication component also provides the original packet to the server. In one embodiment of the out-of-band configuration the distribution component forwards the replicate packet to each of a plurality of probes. In another embodiment, the distribution component forwards the replicate packet to at least one of the plurality of probes based on a load-balancing mechanism. For these embodiments, the forwarded packet includes a source MAC address that is unchanged. Also, the distribution component receives a response packet to the received packet, from at least one probe, and transforms a source MAC address in the response packet to a MAC address of the distribution component. The transformed packet is forwarded based in part on a destination MAC address in the transformed packet.

For in-band operation, the distribution component selects at least one server, and forwards the original packet to at least one selected server using a first forwarding mechanism. The distribution component further selects at least one probe, and forwards the replicate packet to at least one selected probe using a second forwarding mechanism. In one embodiment, the second forwarding mechanism is selected based in part on the first forwarding mechanism.

Illustrative Operating Environment

FIG. 1 illustrates an exemplary environment in which an out-of-band distributor operates for managing traffic to a plurality of probes. Not all of the components may be required to practice the invention, and variations in the arrangement and type of the components may be made without departing from the spirit or scope of the invention.

As shown in the figure, out-of-band system 100 includes client computer 102, wide area network (WAN)/local area network (LAN) 104, router 106, replicator 108, distributor 110, probes 120-122, and servers 130-132.

WAN/LAN 104 is in communication with client computer 102 and router 106. Replicator 108 is in communication with router 106, distributor 110, and servers 130-132. Distributor 110 is also in communication with probes 120-122.

Client computer 102 may be any device capable of sending and receiving a packet over a network, such as WAN/LAN 104, towards servers 130-132. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client computer 102 may be any device that is capable of connecting using a wired or wireless communication medium such as a PDA, POCKET PC, wearable computer, or other device mentioned above that is equipped to use a wired and/or wireless communication medium.

WAN/LAN 104 couples replicator 108 with client computer 102, through router 106. WAN/LAN 104 is enabled to employ any form of computer readable media for communicating information from one electronic device to another. Also, WAN/LAN 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, WAN/LAN 104 includes any communication method by which information may travel between client computer 102 and router 106 to replicator 108.

Router 106 represents virtually any network device that receives and routes a packet towards a destination. Router 106 is typically employed to extend or segment networks by routing the packet from one subnet to another. As shown in the figure, router 106 may represent a router existing on a network border of a business's intranet.

Router 106 may receive the packet from client computer 102 through WAN/LAN 104, and route it towards replicator 108. Similarly, router 106 may receive the packet from servers 130-132, through replicator 108, and route it towards client computer 102.

Router 106 may read a network address in the received packet and make a decision on how to route it based on a variety of conditions, including a most expedient route, a traffic load, a network cost, speed, and the like. Router 106 typically operates at layer three of the typical Open Systems Interconnection (OSI) reference model for networking. However, router 106 may also provide additional functionality that operates above layer three for TCP/IP in the OSI reference model, and the like.

Router 106 may be a specialized computer that is optimized for communications. Router 106 may also represent a set of router actions that are incorporated into a server, network card, and the like. Router 106 may also be implemented as a network-layer bridge, gateway, layer three switch, and the like. As shown in FIG. 1, router 106 is associated with a MAC address represented as "A."

Replicator 108 may be any network device that can receive and replicate a packet. For example, replicator 108 may be a layer two switch, a frame switch, a bridge, and the like. Replicator 108 typically operates at layer two in the OSI reference model for networking. However, replicator 108 may also provide additional functionality that operates above layer two in the OSI reference model.

Replicator 108 may receive the packet from a variety of sources, including router 106, servers 130-132, or another system (not shown). Replicator 108 may forward the received packet based in part on a MAC address, TCP/IP address, TCP/UDP address, and the like.

Replicator 108 may be configured to replicate packets received from a pre-determined source, such as from client computer 102, or from virtually any source. Replicator 108 may replicate the received packet through a process known as port mirroring. However, the present invention is not limited to port mirroring, and virtually any packet replication mechanism may be employed without departing from the scope or spirit of the invention. In any event, the replicated packet may be forwarded to distributor 110. Similarly, packets received from distributor 110 by replicator 108 may be forwarded to its destination based in part on a MAC layer network address in the received packet, or the like.

Distributor 110 may be any device that manages network traffic. Such devices include, for example, routers, proxies, firewalls, load balancers, devices that perform network address translation, any combination of the preceding devices, and the like. Distributor 110 may, for example, receive a replicate packet from replicator 108 and forward it to at least one probe in the array of probes 120-122. Distributor 110 may direct the replicate packet to a particular probe based on network traffic, network topology, capacity of the probe, payload of the replicate packet, and a host of other load balancing metrics. Distributor 110 may also direct the replicate packet to each probe in the array of probes. Distributor 110 may recognize replicate packets that are part of the same communication, flow, and/or stream and may perform special processing on such replicate packets, such as directing them to the same probe. Distributor 110 may forward the replicate packet, as described in more detail in conjunction with FIG. 6.

Distributor 110 may operate at layers two through seven of the OSI reference model for networking. However, in one embodiment, distributor 110 is configured to operate at OSI's layer two, where the forwarding of the packet is based in part on MAC addresses in the packet. In this embodiment, distributor 110 need not employ routing tables, routing protocols, or the like, thereby conserving resources, improving throughput, and avoiding dependencies on TCP/IP addresses in the packet that may have been tampered with. Moreover, where distributor 110 forwards the replicate packet to at least one probe, the MAC addresses in the replicate packet may be left unchanged.

Distributor 110 may further receive a packet from a probe in response to forwarding the replicate packet. Distributor 110 may transform a source MAC address in the response packet to a MAC address associated with distributor 110, as described in more detail in conjunction with FIG. 7, below. For example, as shown in FIG. 1, distributor 110 may replace the source MAC address in the response packet with MAC address "T." Distributor 110 may also employ a destination MAC address in the transformed packet to forward the transformed packet to its destination.

Distributor 110 may be implemented using one or more personal computers, multiprocessor systems, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An exemplary device that could be used as distributor 110 is network device 200 of FIG. 2, configured with appropriate software.

Servers 130-132 may include any computing device capable of connecting to client computer 102, to communicate information in the form of packets. Each packet may convey a piece of information. A packet may be sent for handshaking, i.e., to establish a connection or to acknowledge receipt of data. The packet may include information such as a request, response, or configuration command. Generally, packets received by servers 130-132 will be formatted according to TCP/IP, but they could also be formatted using another transport protocol, such as User Datagram Protocol (UDP), Internet Control Message Protocol (ICMP), NETbeui, IPX/SPX, token ring, and the like.

Figure 2:
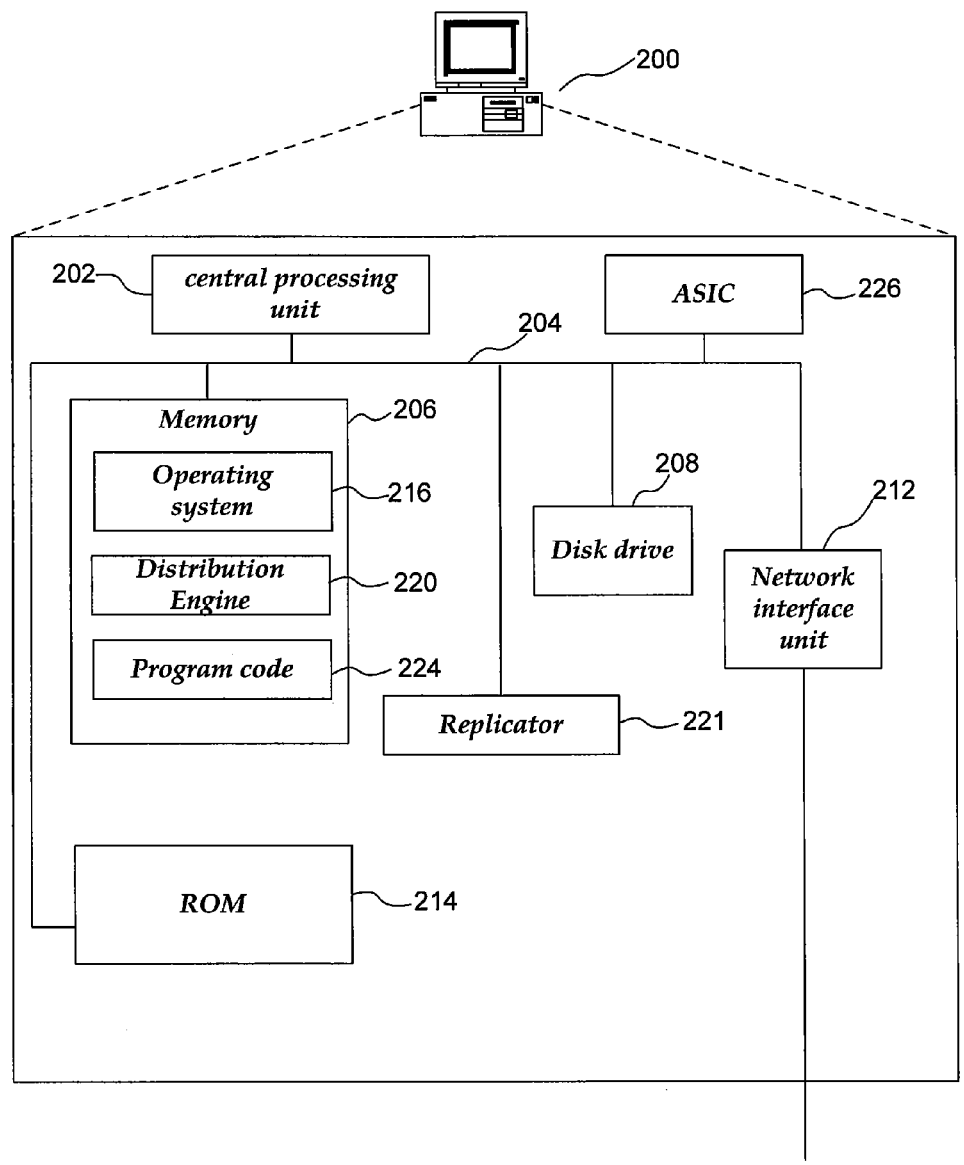
FIG. 2 illustrates components of an exemplary environment in which the invention may be practiced.

Devices that may operate as servers 130-132 include, but are not limited to, personal computers desktop computers, multiprocessor systems, microprocessor-based or programmable consumer electronics, network PCs, servers, and the like. Servers 130-132 may also be configured to operate as a website, FTP site, mail server, and the like. Servers 130-132 may also represent another client within a business's intranet that is configured to send and receive packets with client computer 102. FIG. 2 illustrates one embodiment of servers 130-132 as a network device.

Probes 120-122 include virtually any network component that is configured to monitor, investigate, test the status of a system, network, web site, packet, and the like. In the security domain, probes 120-122 may be employed to perform actions including, but not limited to scanning for viruses, unauthorized emails, unauthorized network accesses, intrusions, denial of service attacks, and the like.

Probes 120-122 include standalone network devices, as well as components integrated within another device, such as a server, personal computer, network card, and the like. Probes 120-122 may be configured such that each probe is directed to detecting a different action. For example, probe 120 may be dedicated to analyzing and responding to received packets that may include unauthorized emails, while probe 121 may be dedicated to detecting and responding to packets that may be associated with unauthorized network intrusions. Probes 120-122 may also be configured to perform substantially similar actions. For example, probes 120-122 may each be directed to detecting and responding to received packets that may be associated with unauthorized emails, and the like. For example, probes 120-122 may include any of the available security systems, including, but not limited to Blink® Intrusion Prevention System by eEye Digital Security, Retina® Network Security Scanner by eEye Digital Security, Feszer and Sharefuzz by @Stake, and the like.

Moreover, at least one of probes 120-122 may be configured to receive packets in a promiscuous mode, where virtually any packet on the network is recognized and analyzed by the probe regardless of the protocol type, address header, destination, or the like associated with the packet.

Probes 120-122 may provide a response packet based in part on the results of the analysis of the received packet. For example, probe 120, may provide a response packet that includes a reset command, requesting termination of a connection between a server and a client associated with the received packet. The response packet may further include an alert instruction to the server, and the like, that indicate if the probe detects a potential threat.

FIG. 2 shows an exemplary network device 200 that may operate as distributor 110 of FIG. 1. It will be appreciated that not all components of network device 200 are illustrated, and that network device 200 may include more or fewer components than those shown in FIG. 2. Network device 200 may operate, for example, as a router, bridge, firewall, gateway, traffic management device (also referred to as a traffic manager), distributor, load balancer, server array controller, proxy server, and the like. Communication takes place over a network, e.g., the Internet, WAN, LAN, and the like.

As illustrated in FIG. 2, network device 200 includes a central processing unit (CPU) 202, mass memory, and a network interface unit 212 connected via a bus 204. Network interface unit 212 includes the necessary circuitry for connecting network device 200 to network 130, and is constructed for use with various communication protocols including the TCP/IP and UDP/IP protocol. Network interface unit 212 may include or interface with circuitry and components for transmitting messages and data over a wired and/or wireless communications medium. Network interface unit 212 is sometimes referred to as a transceiver.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, or Windows™

In one embodiment, the mass memory stores program code and data for implementing distribution engine 220. The mass memory may also store additional program code 224 and data for performing the functions of network device 200.

In one embodiment, network device 200 includes replicator 221, which operates substantially similar to replicator 108 of FIG. 1. It will be apparent, however, that network device 200 may include either replicator 221 or distribution engine 220, or both replicator 221 and distribution engine 220, as described in more detail below in conjunction with FIGS. 4-5.

In one embodiment, network device 200 includes one or more Application Specific Integrated Circuit (ASIC) chip 226 connected to bus 204. As shown in FIG. 2, network interface unit 212 may connect to 204 bus through at least one ASIC chip. ASIC chip 226 can include logic that enables at least some of the actions of network device 200. For example, in one embodiment, ASIC chip 226 can be employed to perform packet processing functions on incoming and/or outgoing packets. In one embodiment, ASIC chip 226 performs logic for distribution engine 220. In one embodiment, network device 200 includes one or more field-programmable gate arrays (FPGA) (not shown), instead of, or in addition to, ASIC chip 226. A number of actions for the network device can be performed by ASIC chip 226, an FPGA, CPU 202 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include RAM 206, ROM 214, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 200 may also include an input/output interface (not shown) for communicating with external devices or users.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in the chassis.

Figure 3:
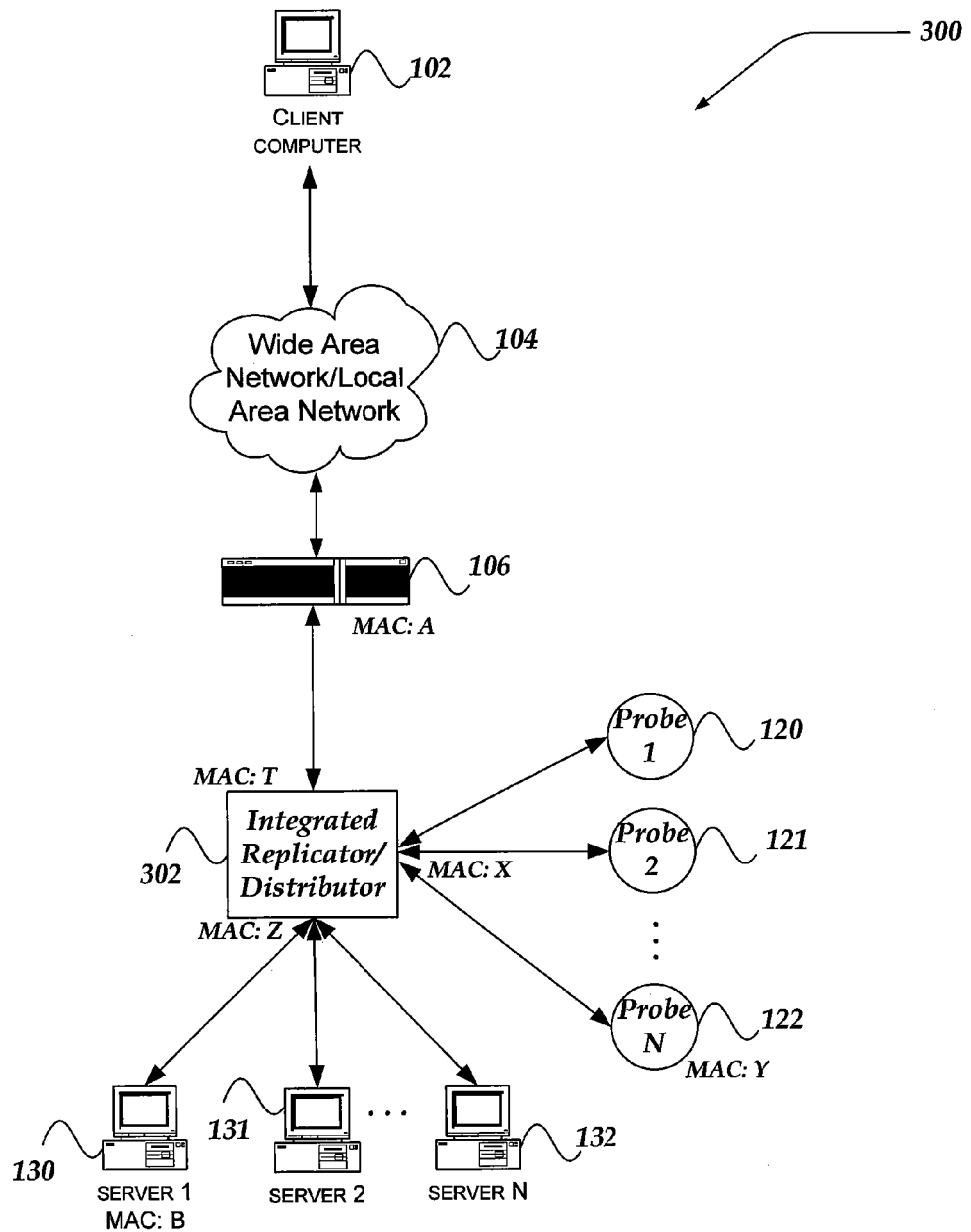
FIG. 3 illustrates another exemplary environment in which an integrated replicator/distributor operates for managing traffic to a plurality of probes.

FIG. 3 shows another exemplary environment in which an integrated replicator/distributor operates for managing traffic to a plurality of probes. Integrated system 300 may include many more components than those shown.

As shown in the figure, integrated system 300 includes client computer 102, WAN/LAN 104, router 106, integrated replicator/distributor 302, probes 120-122, and servers 130-132.

WAN/LAN 104 is in communication with client computer 102 and router 106. Integrated replicator/distributor 302 is in communication with router 106, servers 130-132, and probes 120-122.

Components numbered similarly to those in FIG. 1 operate similarly. A difference between the environment shown in FIG. 1 and that shown in FIG. 3 is that the functionality of distributor 110 and replicator 108 have been combined in integrated replicator/distributor 302. It will be understood that integrated replicator/distributor 302 may also be configured to have more than one router connected to it.

As shown in FIG. 3, integrated replicator/distributor 302 may operate in an out-of-band configuration and an in-band configuration, as is described in more detail below in conjunction with FIGS. 4-5, respectively. Briefly, however, in the out-of-band configuration, integrated replicator/distributor 302 operates logically like a combination of replicator 108 and distributor 110. That is, a packet received from client computer 102 through WAN/LAN 104 may be replicated by integrated replicator/distributor 302. The replicate packet is forwarded to at least one probe in the array of probes 120-122 by integrated replicator/distributor 302. The original received packet is forwarded to at least one server in the array of servers 130-132. Selection of the at least one probe may employ substantially similar mechanisms as described above, in conjunction with FIG. 1. As described in more detail below, in conjunction with FIG. 4, for the in-band configuration, integrated replicator/distributor 302 may also select a probe based in part on a mechanism employed to select at least one server from the array of servers 130-132.

The configuration of FIG. 3 may be used for various reasons including to lower costs (of providing two distinct devices), saving space, and the like.

Figure 4:
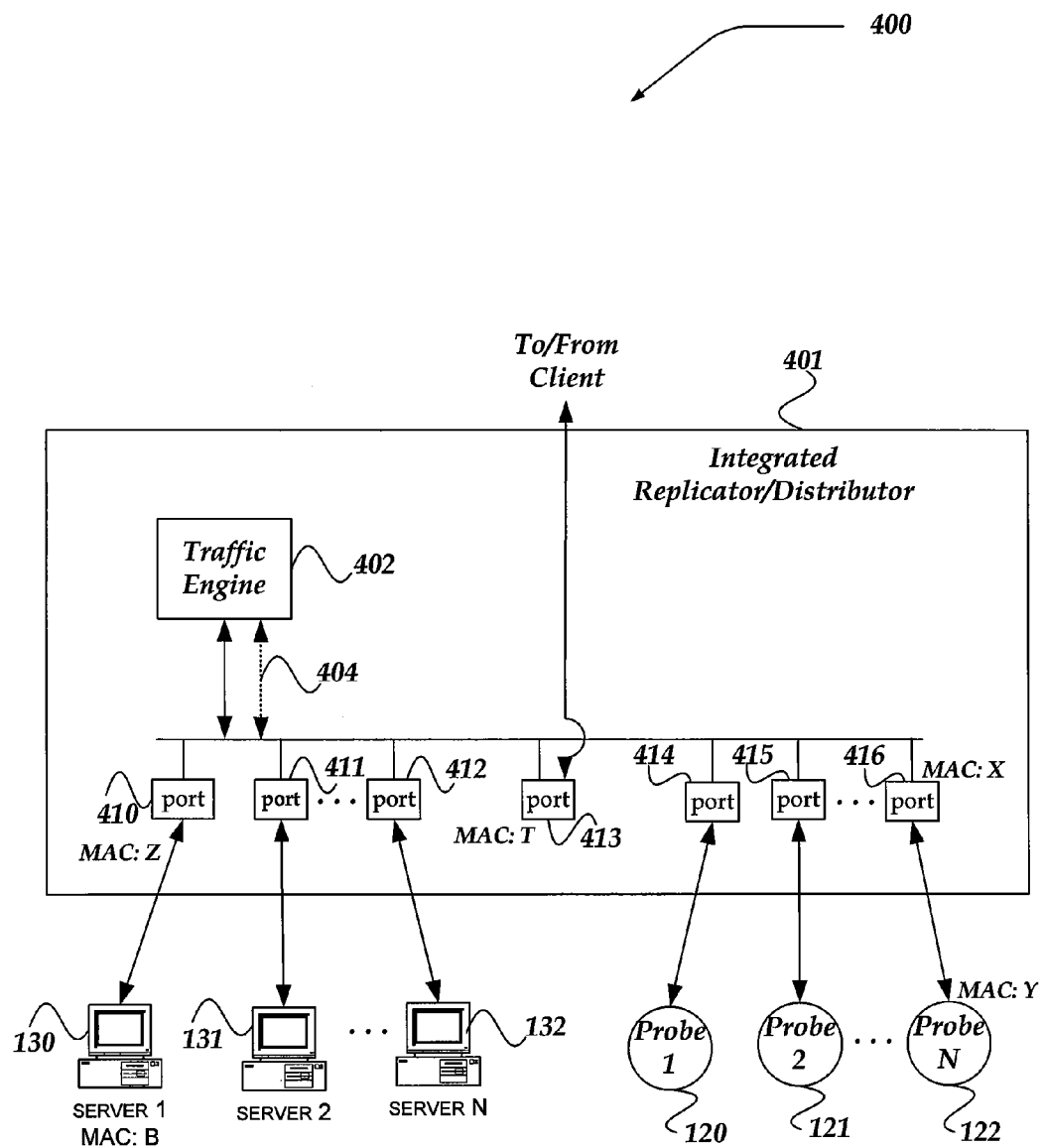
FIG. 4 illustrates one embodiment of components of an out-of-band integrated replicator/distributor for managing traffic of FIG. 3.

FIG. 4 illustrates one embodiment of components of an out-of-band integrated replicator/distributor for managing traffic of FIG. 3. Integrated out-of-band configuration 400 may include many more components than those shown. The components shown, however, are sufficient to disclose an illustrative embodiment for practicing the invention.

As shown in FIG. 4, integrated out-of-band configuration 400 includes integrated replicator/distributor 401, probes 120-122, and servers 130-132. Integrated replicator/distributor 401 includes traffic engine 402, ports 410-416, and optional mirrored link 404. Traffic engine 402 is in communication with ports 410-416. Ports 410-412 are in communication with servers 130-132, respectively. Ports 414-416 are in communication with probes 120-122, respectively. Components numbered similar to those in FIG. 1 operate in substantially the same manner.

Ports 410-16 may include virtually any network connector, which enables forwarding of packet frames between networks, network segments, and the like. As such ports 410-416 may include, but are not limited to bridges, routers, layer two switches, and frame switches, including dynamic port switches, dynamic segment switches, static switches, and the like. Ports 410-416 may operate at layer two of the OSI reference model for networking. Ports 410-412 may reside on a different virtual local area network (VLAN) from ports 414-416. Moreover, each port 414-416 may further reside on a different VLAN from each other.

Port 413 may include a replication component (not shown) that enables a received packet to be replicated. The replication component may be configured to replicate a packet based in part on a source of the packet. For example, in one embodiment, replication component of port 413 is configured to replicate a packet when received from client computer 102 of FIG. 1.

Port 413 may replicate packet using a variety of mechanisms. In one embodiment, the replication component of port 413 performs replication by using a port mirroring mechanism. In another embodiment, the replication component of port 413 turns off a learning mode, such that each replicate packet is broadcast to ports 410-412, and to traffic engine 402.

Because probes 120-122 reside on different VLANS than servers 130-132 and traffic engine 402, they are likely not to receive the replicate packet from port 413.

In one embodiment, port 413 forwards the original packet to at least one server in the array of servers 130-132. In another embodiment, port 413 forwards the original packet to traffic engine 402, rather than to servers 130-132.

Traffic engine 402 is configured to receive a replicate packet from port 413. Port 413 may employ optional mirrored link 404 to forward the replicate packet to traffic engine 402, thereby avoiding forwarding the replicate packet to servers 130-132. Traffic engine 402 forwards the replicate packet to at least one probe in the array of probes 12-122. Traffic engine 402 may also receive a response packet from the at least one probe. Traffic engine 402 may manage the replicate packet and the response packet as described below, in more detail in conjunction with FIGS. 6-7.

In one embodiment, traffic engine 402 receives the original packet from port 413. Traffic engine 402 may select at least one server from the array of servers 130-132 for which to forward the original packet, as described in conjunction with FIG. 6.

Figure 5:
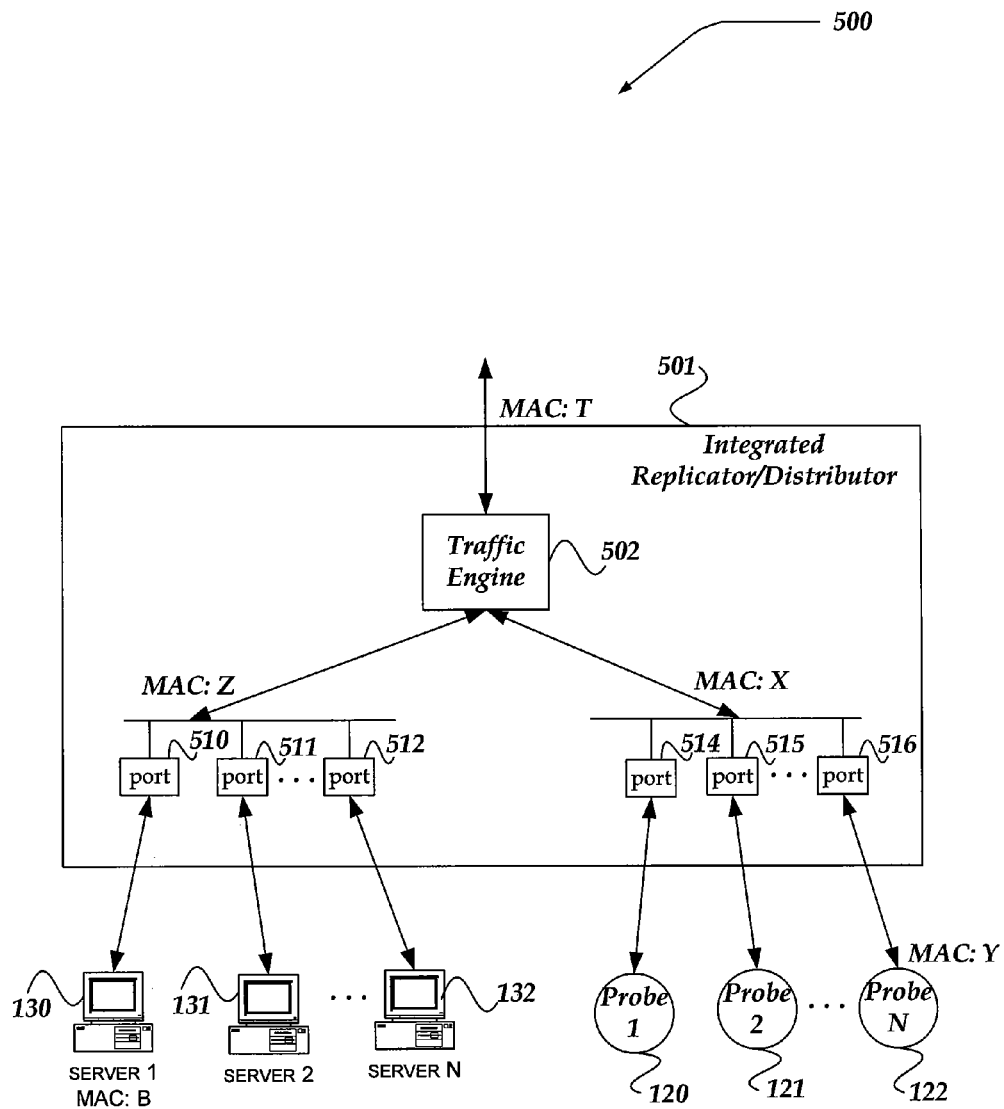
FIG. 5 illustrates one embodiment of components of an in-band integrated replicator/distributor for managing traffic of FIG. 3.

FIG. 5 illustrates one embodiment of components of an in-band integrated replicator/distributor for managing traffic of FIG. 3. Integrated in-band configuration 500 may include many more components than those shown. The components shown, however, are sufficient to disclose an illustrative embodiment for practicing the invention.

As shown in FIG. 5, integrated in-band configuration 500 includes integrated replicator/distributor 501, probes 120-122, and servers 130-132. Integrated replicator/distributor 501 includes traffic engine 502, ports 510-512, and ports 514-516. Traffic engine 502 is in communication with ports 510-512, and ports 514-516. Ports 510-512 are in communication with servers 130-132, respectively. Ports 514-516 are in communication with probes 120-122, respectively.

Components numbered similar to those in FIG. 1 operate substantially similar. Moreover, ports 510-512 and 514-516 operate substantially similar to ports 410-12 and 414-416, described above, in conjunction with FIG. 4.

A difference between the environment shown in FIG. 4 and that shown in FIG. 5 is that traffic engine 502 is in the flow of packets between a client, such as client computer 102 in FIG. 1, and servers 130-132. Moreover, traffic engine 502 comprises the functionality of distributor 110 and replicator 108 of FIG. 1. Traffic engine 502 may also be enabled to forward the original packet from the client to at least one server in the array of servers 130-132. Traffic engine 502 may select the at least one server to forward the original packet based on a variety of mechanisms, including but not limited to a round trip time (RTT), least connections, packet completion rate, quality of service, topology, global availability, hop metric, hash of an address in the packet, static ratio, dynamic ratio, address in the packet, content of the replicate packet, round robin mechanism, and a similar forwarding mechanism.

Traffic engine 502 may also replicate the original packet and forward the replicate packet to at least one probe in the array of probes 120-122. Traffic engine 502 may select at least one probe based on a load-balancing mechanism, such as described above. In one embodiment, the load-balancing mechanism employed to select at least one server is different and independent of the mechanism employed to select at least one probe. Traffic engine 502 may also select the probe to forward the replicate packet, based in part on the mechanism employed for selecting at least one server. Moreover, traffic engine 502 may select to forward the replicate packet to each probe in the array of probes 120-122. In one embodiment, at least one probe is configured to receive the replicate packet in a promiscuous mode.

Traffic engine 502 may also receive a response packet from at least one probe, in response to the forwarded replicate packet. Traffic engine 502 may forward the response packet based in part on information in the response packet.

Traffic engine 502 may forward packets (e.g., original packets, response packets, and replicate packets) based on MAC addresses in the packets. However, traffic engine 502 is not so limited. Traffic engine 502 may also forward the packets using a TCP/IP, TCP/UDP address in the packet, or other information associated with the packet. Traffic engine 502 may further perform an address resolution protocol (ARP) procedure that results in an address for the packet. Traffic engine 502 may employ the resulting address to forward the packet. Thus, traffic engine 502 need not preserve MAC addresses in the response packet.

Illustrative Operation for Managing Traffic to a Probe

Figure 8:
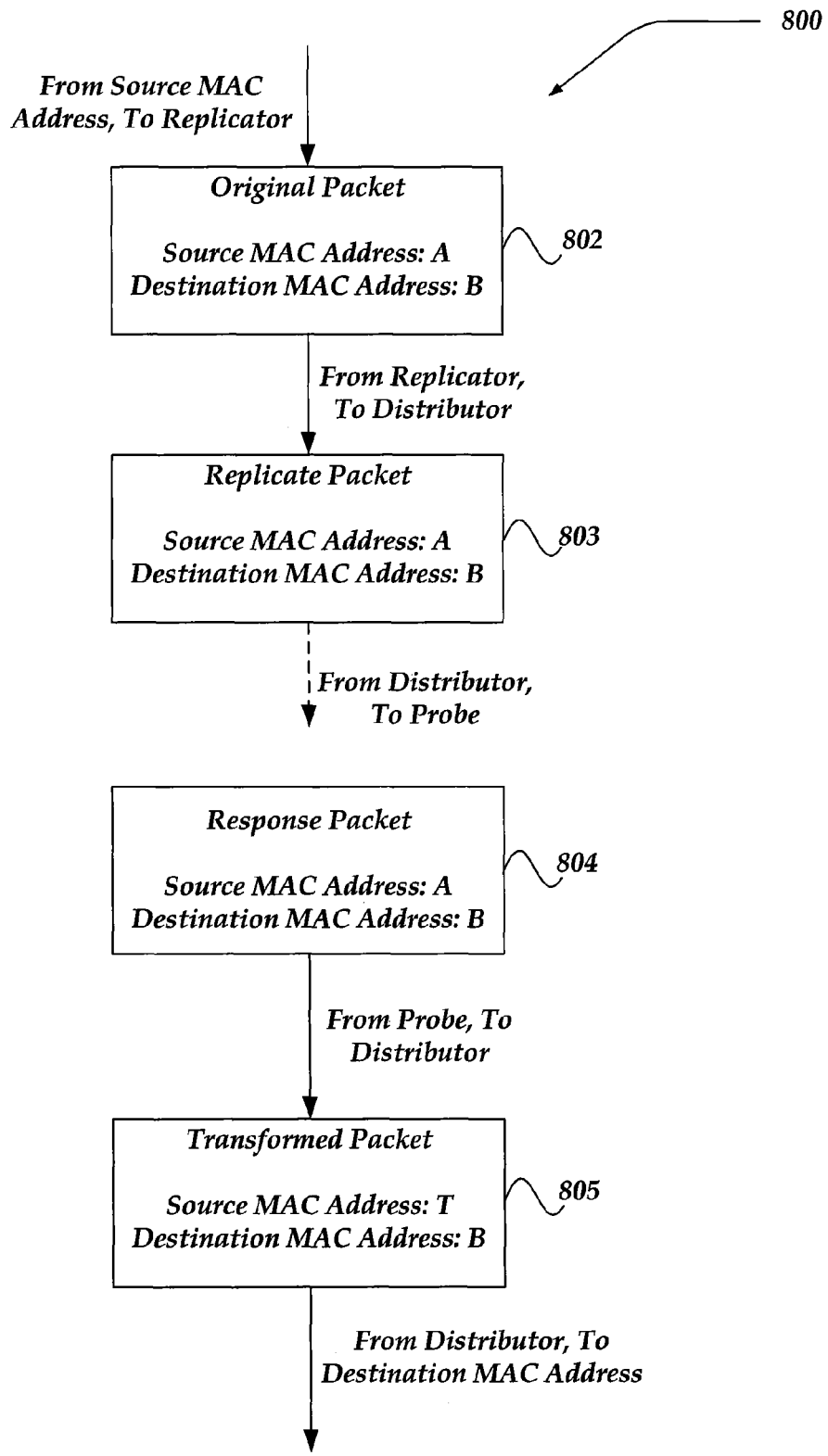
FIG. 8 illustrates one example of selected header information associated with network packets communicated through an out-of-band system, such as shown in FIGS. 1 and 4.
Figure 9:
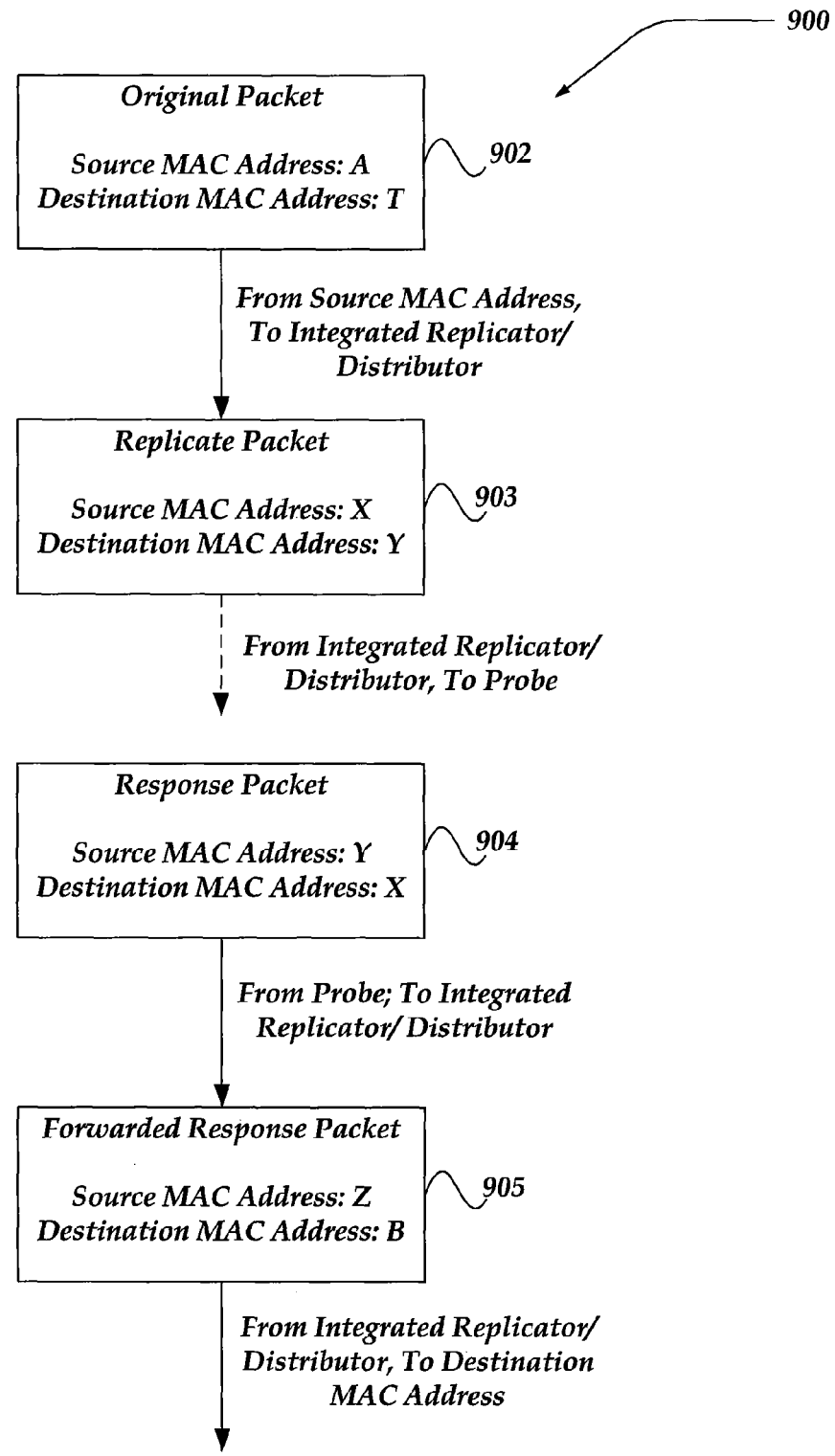
FIG. 9 illustrates one example of selected header information associated with network packets communicated through an in-band integrated replicator/distributor, such as shown in FIG. 5, in accordance with the present invention.

The operation of certain aspects of the present invention will now be described with respect to FIGS. 6-7. FIGS. 8-9 are employed to provide illustrative examples of header information associated with network packets to further aid in illustrating the flowcharts.

Figure 6:
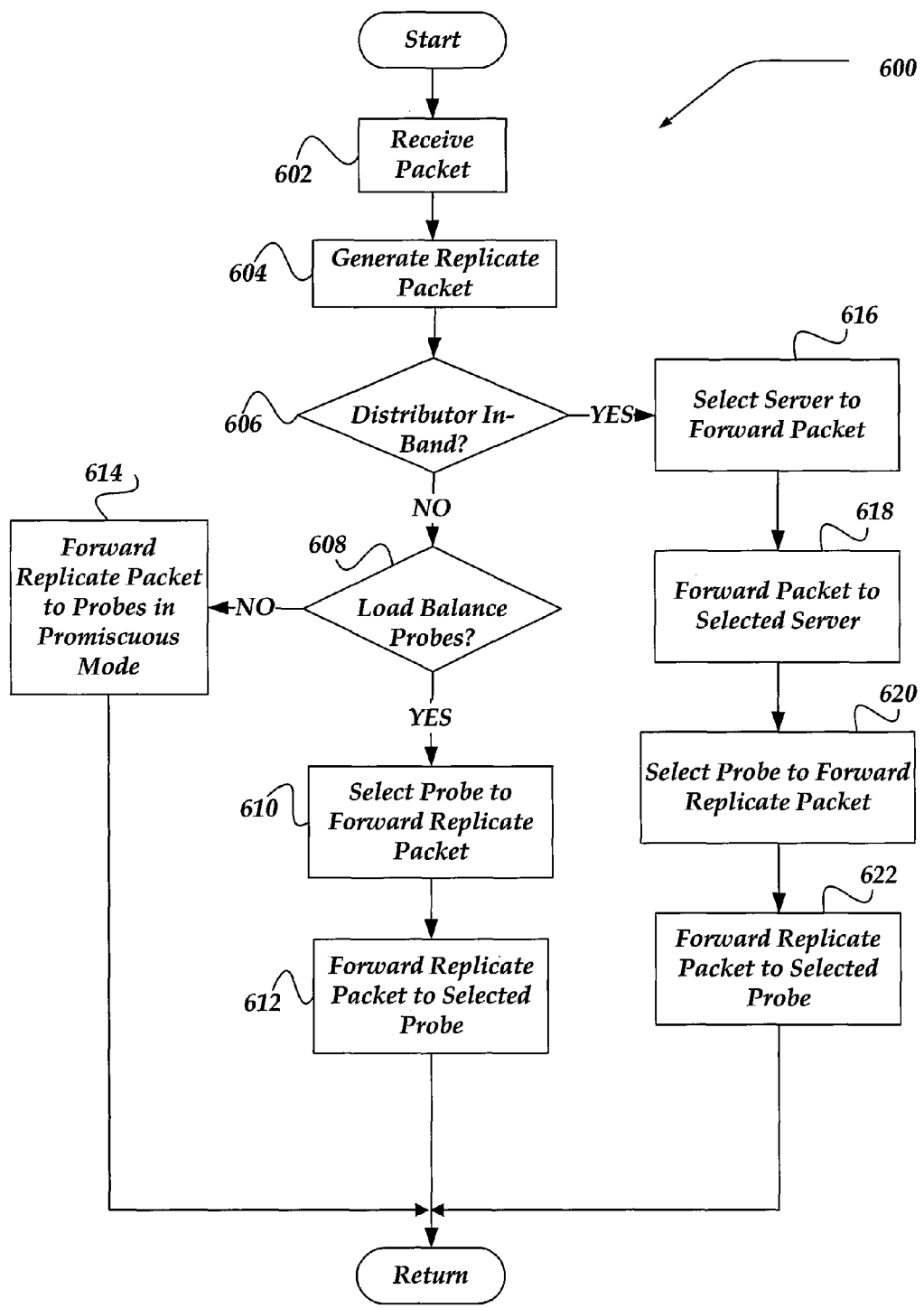
FIG. 6 illustrates a flow chart for one embodiment of a process for managing network traffic to a probe.

FIG. 6 illustrates a flow chart for one embodiment of a process for managing network traffic to a probe. Process 600 may operate for example, in distributor 110 of FIG. 1, and integrated replicator/distributor 302 of FIG. 3.

Process 600 begins, after a start block, at block 602, when a packet is received. The packet is typically sent from a client to a server. For example, the packet may come from client computer 102 and be destined for server 130 of FIG. 1.

Processing continues to block 604, where a replicate of the packet is generated. Generation of the replicate packet may be performed by a variety of mechanisms, including port mirroring, or the like. Moreover, not every packet need be replicated. In one embodiment of the present invention, a characteristic of the received packet is employed to determine which packets to replicate. For example, a received packet may be replicated based on an application characteristic, a network characteristic, a payload characteristic, an address of the packet, and the like.

Processing continues to decision block 606, where a determination is made whether a distributor is in-band to a flow of packets between the client and the server. If it is determined that the distributor in-band to the flow of packets, processing branches to block 616; otherwise, processing continues to decision block 608.

At decision block 608, a determination is made whether a plurality of probes is to load-balanced. If the plurality of probes is to load-balanced, processing continues to block 610; otherwise, processing branches to block 614. Although not required, load balancing of the plurality of probes may be employed when, for example, each of the probes perform substantially the same actions on the replicate packet.

At block 610, a probe is selected from the plurality of probes for which the replicate packet is to be sent. Virtually any of a variety of load-balancing mechanisms may be employed to select the probe. Such load-balancing mechanisms include, but are not limited to, round trip time (RTT), least connections, packet completion rate, quality of service, topology, global availability, hop metric, hash of an address in the replicate packet, static ratio, dynamic ratio, address in the replicate packet, content of the replicate packet, and round robin. In one embodiment, a hash of the destination IP address and source IP address associated with the replicate packet is employed to select the probe. In another embodiment, a hash of an IP address and a port number associated with the replicate packet is employed to select the probe. Processing proceeds to block 612, where the replicate packet is forwarded to the selected probe. When the replicate packet is forwarded to the selected probe, a MAC address associated with the replicate packet is left unchanged. MAC addresses are preserved so that, should a probe select to provide a response packet, it may employ the MAC addresses, rather than TCP/IP addresses, or the like. Upon completion of block 612, processing returns to perform other actions.

Alternatively, if at decision block 608, it is determined not to load balance the probes, processing branched to block 614, where the replicate packet is forwarded to each of the plurality of probes. When the replicate packet is forwarded to each probe, the MAC address associated with the replicate packet is left unchanged. In one embodiment, at least one probe is configured to receive the replicate packet in a promiscuous mode. In such a manner, any packet on the network segment is received by the at least one probe, virtually independent of a destination address associated with that packet. Upon completion of block 614, processing returns to perform other actions.

Back at decision block 606, if it is determined that the distributor is in-band to the flow of packets between the client and the server, processing proceeded to block 616, where a server is selected to forward the original packet. The server may be selected from a plurality of servers employing a variety of forwarding mechanisms. For example, the server may be selected based on an address in the original packet. The server may also be selected based on a load-balancing mechanism including, but not limited to a round trip time (RTT), a least connections, a packet completion rate, a quality of service, a topology, a global availability, a hop metric, a hash of an address in the original packet, a static ratio, a dynamic ratio, an address in the original packet, a content of the original packet, and a round robin. Next, processing proceeds to block 618, where the original packet is forwarded to the selected server.

Processing continues to block 620, where at least one probe is selected from the plurality of probes to which to send the replicate packet. The selection of at least one probe may be based on a variety of mechanisms. For example, in one embodiment, it may be determined that the replicate packet is sent to each probe. In this embodiment, at least one probe is configured to receive the replicate packet in promiscuous mode. In another embodiment, the forwarding mechanism employed to select at least one probe, is determined based in part on the forwarding mechanism employed for selecting the server at block 616, as discussed above. In another embodiment, at least one probe is selected based on a characteristic associated with the replicate packet, including, but not limited to an application, a network, and a payload associated with the replicate packet. For example, at least one probe may be selected based on whether the replicate packet is associated with an email packet, compressed file, and the like. Upon selection of at least one probe, processing continues to block 622, where the replicate packet is forwarded to at least one selected probe. Upon completion of block 622, processing returns to perform other actions.

Figure 7:
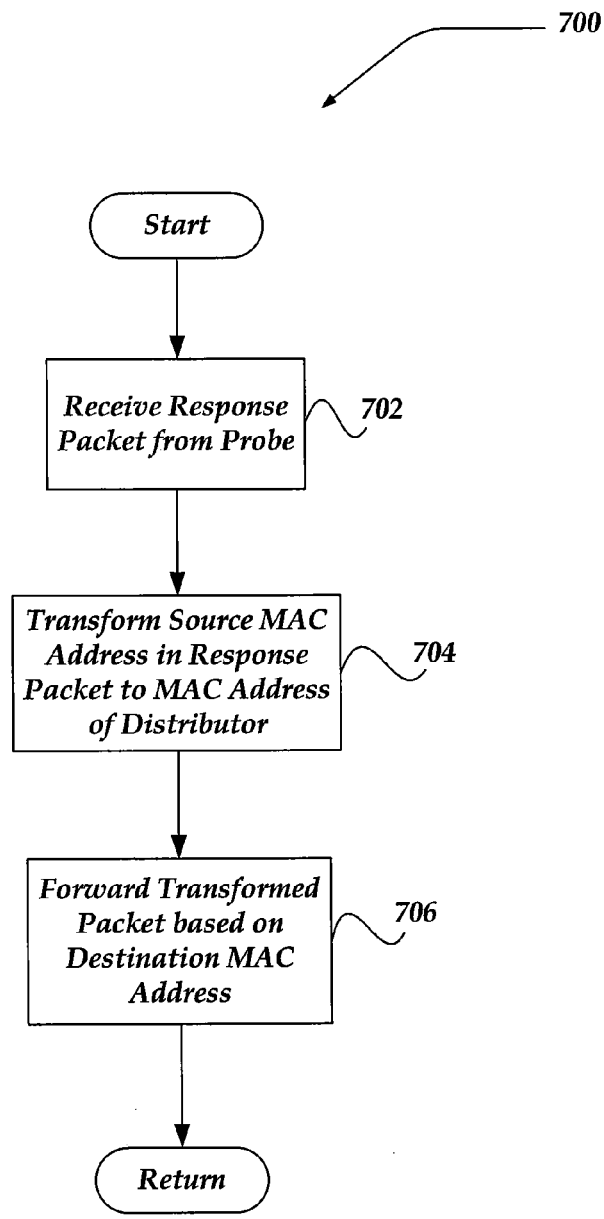
FIG. 7 illustrates a flow chart for one embodiment of a process for managing network traffic from a probe in an out-of-band configuration, such as shown in FIGS. 1 and 4.

FIG. 7 shows a flow chart for one embodiment of a process for managing network traffic from a probe in an out-of-band configuration. Process 700 may operate for example, in distributor 110 of FIG. 1, and integrated replicator/distributor 401 of FIG. 4. In particular, process 700 may operate as a component of distribution engine 220 of FIG. 2.

Process 700 begins, after a start block, at block 702, when an out-of-band distributor receives a response packet from at least one probe. A probe may provide a response packet based on having received the replicate packet from process 600 of FIG. 6. The response packet may include a reset command to a server, requesting termination of a connection between the server and a client associated with the original packet, or the like. The response packet may further include an alert instruction to the server, and the like, that indicate that a potential threat is detected by the probe.

Processing next continues to block 704, where a source MAC address in the response packet is transformed to a MAC address associated with the distributor. Transformation of the MAC addresses, enables, the invention to employ MAC addresses to forward the packet, and to indicate the source of the response packet as the distributor. This further enables the invention to avoid using IP addresses, which may have been tampered with.

Processing continues to block 706, where the transformed packet is forwarded based in part on the destination MAC address in the transformed packet. Upon completion of block 706, processing returns to perform other actions.

FIG. 8 illustrates one example of selected header information associated with network packets communicated through an out-of-band system, such as shown in FIGS. 1 and 4, and further described in conjunction with FIGS. 6-7.

As described above at block 602 in FIG. 6, an original packet is received from the client. Original packet 802 of FIG. 8 provides an example of such a received packet illustrating a source MAC address "A," and destination MAC address "B," that substantially corresponds to router 106, and server 130, respectively, as shown in FIG. 1. Also, as described at block 604 in FIG. 6, a replicate packet is generated. Replicate packet 803 in FIG. 8 illustrates an exemplary replicate packet that shows the same source and destination MAC addresses as original packet 802.

Recall that at block 702 of FIG. 7, a response packet may be sent by at least one probe. Response packet 804 of FIG. 8 illustrates an example of such a response packet, showing the same source and destination MAC addresses as original packet 802. Moreover, transformed packet 805 of FIG. 8 provides an example of the transformed packet generated at block 704 of FIG. 7.

FIG. 9 illustrates one example of selected header information associated with network packets communicated through an in-band integrated replicator/distributor, such as shown in FIG. 5, and further described in conjunction with FIGS. 6-7. As is described above, MAC addresses need not be preserved in the in-band configuration. Hence, original packet 902 of FIG. 9 includes a source MAC address "A" and a destination MAC address "T," corresponding to router 106, and integrated replicator/distributor 302 of FIG. 3, respectively. However, replicate packet 903 of FIG. 9 is generated with a source MAC address "X," and a destination MAC address "Y," corresponding to port 516 and probe 122 of FIG. 5, respectively. Similarly, response packet 904 of FIG. 9 provides an example response packet with a source MAC address "Y," and a destination MAC addresses "X," corresponding to probe 122 port 516, respectively. Furthermore, forwarded response packet 905 of FIG. 9 provides an example of a response packet forwarded to a destination, showing a source MAC address "Z," and a destination MAC "B," corresponding to port 510 and server 130 of FIG. 5, respectively.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. An apparatus for routing a packet over a network, comprising:
    a replication component that generates a replicate packet for each received packet; and
    a non-transitory distribution component in communication with the replication component, wherein the distribution component is arranged to perform actions, including:
        if a first mode is selected, forwarding the replicate packet to each of a plurality of probes while forwarding the received packet to at least one server, wherein the plurality of probes comprises two or more security probes that each perform a different security analysis on the replicate packet;
        if a second mode is selected:
            selecting which one of the plurality of probes to forward the replicate packet based at least on an application associated with the replicate packet and further based on a load-balancing mechanism; and
            forwarding the replicate packet to the selected one of the plurality of probes while forwarding the received packet to at least one server; and
        if a response packet received from at least one probe in the plurality of probes includes a reset command to the at least one server, terminating a connection between the at least one server and a client associated with the received packet.

2. The apparatus of claim 1, wherein the load-balancing mechanism further comprises at least one of a round trip time (RTT), least connections, packet completion rate, quality of service, topology, global availability, hop metric, hash of an address in the replicate packet, static ratio, dynamic ratio, address in the replicate packet, content of the replicate packet, and round robin.

3. The apparatus of claim 1, wherein at least one security probe in the two or more security probes is arranged to perform a security analysis that comprises scanning the replicate packet for at least one of a virus, an unauthorized email, an unauthorized network access, an intrusion, or a denial of service attack.

4. The apparatus of claim 1, wherein forwarding the replicate packet to each of the plurality of probes further comprises configuring at least one of the probes to receive the replicate packet in a promiscuous mode.

5. The apparatus of claim 1, wherein the distribution component is arranged to perform actions, further comprising:
    transforming a source MAC address in the response packet to a MAC address of the distribution component; and
    forwarding the transformed packet based in part on a destination MAC address in the transformed packet.

6. The apparatus of claim 1, wherein the distribution component is arranged to perform actions, further comprising:
    selecting at least one server in a plurality of servers for which to forward the received packet.

7. The apparatus of claim 6, wherein selecting at least one server further comprises basing the selection in part on a load-balancing mechanism.

8. The apparatus of claim 1, wherein the replication component is arranged to perform actions, further comprising forwarding each received packet towards at least one server that is associated with a destination of the received packet.

9. The apparatus of claim 1, wherein the load-balancing mechanism further comprises selecting one of the plurality of probes based in part on a mechanism employed for selecting a server in a plurality of servers to which to forward the packet.

10. The apparatus of claim 1, wherein forwarding the replicate packet further comprises forwarding the replicate packet based in part on at least one of a network characteristic, a payload characteristic, and a selection characteristic of the replicate packet.

11. The apparatus of claim 1, wherein replicating the packet further comprises mirroring the packet at a port.

12. The apparatus of claim 1, wherein selecting the one of the plurality of probes is further based in part on a payload characteristic of the replicate packet.

13. The apparatus of claim 1, wherein selecting the one of the plurality of probes is further based in part on a selection characteristic of the replicate packet.

14. A method for routing a packet over a network, comprising:
    receiving the packet;
    replicating the packet;
    forwarding the packet to a server in a plurality of servers using a first forwarding mechanism;
    selecting which of at least one probe of a plurality of probes to forward the replicate packet using a second forwarding mechanism and based at least on an application associated with the replicate packet, wherein the plurality of probes comprises two or more security probes that each perform a different security analysis on the replicate packet;
    forwarding the replicate packet to the selected at least one probe using the second forwarding mechanism;
    if a response packet received from at least one probe in the plurality of probes includes a reset command to the server, terminating a connection between the server and a client associated with the packet, and
    wherein the second forwarding mechanism further comprising the selecting based on a load-balancing mechanism.

15. The method of claim 14, wherein the second forwarding mechanism is selected based in part on the first forwarding mechanism.

16. The method of claim 14, wherein the first forwarding mechanism further comprises selecting at least one server based in part on a load-balancing mechanism.

17. The method of claim 14, wherein the second forwarding mechanism further elects the at least one probe based in part on at least one of a network characteristic, a payload characteristic, and a selection characteristic of the replicate packet.

18. An apparatus for routing a packet over a network, comprising:
   a replication component that generates a replicate packet for each received packet; and
   a non-transitory traffic engine, coupled to the replication component, that is arranged to perform actions, including:
   receiving the packet; receiving the replicate packet;
   forwarding the packet to a server in a plurality of servers using a first forwarding mechanism;
   selecting which of at least one probe of a plurality of probes to forward the replicate packet using a second forwarding mechanism and based at least on an application associated with the replicate packet, wherein the plurality of probes comprises two or more security probes that each perform a different security analysis on the replicate packet;
   forwarding the replicate packet to the selected at least one probe using the second forwarding mechanism,
   if a response packet received from at least one probe in the plurality of probes includes a reset command to the server, terminating a connection between the server and a client associated with the packet, and
   wherein the second forwarding mechanism further comprising the selecting based on a load-balancing mechanism.

19. The apparatus of claim 18, wherein the second forwarding mechanism is selected based in part on the first forwarding mechanism.

20. The apparatus of claim 18, wherein the replication component is configured to replicate the packet by turning off a learning mode.

21. A method for routing a packet over a network, comprising:
   receiving the packet at a distribution component;
   replicating the packet;
   forwarding the packet to a server in a plurality of servers using a first forwarding mechanism;
   selecting which of at least one probe of a plurality of probes to forward the replicate packet using a second forwarding mechanism and based at least on an application associated with the replicate packet, wherein the plurality of probes comprises two or more security probes that each perform a different security analysis on the replicate packet;
   forwarding the replicate packet to the selected at least one probe using the second forwarding mechanism;
   if a response packet received from at least one probe in the plurality of probes includes a reset command to the server, terminating a connection between the server and a client associated with the packet;
   transforming a source MAC address in the response packet to a MAC address of the distribution component;
   forwarding the transformed packet based in part on a destination MAC address in the transformed packet, and
   wherein the second forwarding mechanism further comprising the selecting based on a load-balancing mechanism.

22. The method of claim 21, wherein replicating the packet further comprises mirroring the packet at a port.

23. The method of claim 21, wherein the second forwarding mechanism is selected based in part on the first forwarding mechanism.

24. The method of claim 21, wherein replicating the packet further comprises turning off a learning mode.

25. The method of claim 21, wherein the first forwarding mechanism further comprises selecting the at least one server based on a load-balancing mechanism.

26. An apparatus for routing a packet over a network, comprising:
   a means for receiving a packet;
   a means for replicating the packet;
   a means for forwarding the packet to a server using a first forwarding mechanism;
   a means for selecting which of at least one probe of a plurality of probes to forward the replicate packet using a second forwarding mechanism and based at least on an application associated with the replicate packet, wherein the plurality of probes comprises two or more security probes that each perform a different security analysis on the replicate packet;
   a means for forwarding the replicate packet to the selected at least one probe using the second forwarding mechanism;
   a means for terminating a connection between the server and a client associated with the packet a response packet received from at least one probe in the plurality of probes includes a reset command to the server, and
   wherein the second forwarding mechanism further comprising the selecting based on a load-balancing mechanism.

27. A system for routing a packet over a network, comprising:
   a replication component that generates a replicate packet for each received packet; and
   a non-transitory distribution component that receives the replicate packet from the replication component, wherein the distribution component is arranged to perform actions, including:
   if a first mode is selected, forwarding the replicate packet to each of a plurality of probes while forwarding the received packet to at least one server, wherein the plurality of probes comprises two or more security probes that each perform a different security analysis on the replicate packet;
   if a second mode is selected:
   selecting which one of the plurality of probes to forward the replicate packet based at least on an application associated with the replicate packet; and
   forwarding the replicate packet to the selected one of the plurality of probes while forwarding the received packet to at least one server;
      if a response packet received from at least one probe in the plurality of probes includes a reset command to the at least one server, terminating a connection between the at least one server and a client associated with the received packet, and
   wherein the second mode further comprising the selecting based on a load-balancing mechanism.

28. The system of claim 27, wherein at least one security probe in the two or more security probes is arranged to perform a security analysis that comprises scanning the replicate packet for at least one of a virus, an unauthorized email, an unauthorized network access, an intrusion, or a denial of service attack.

29. The system of claim 27, wherein forwarding the replicate packet to each of the plurality of probes further comprises configuring at least one of the probes to receive the replicate packet in a promiscuous mode.

30. A non-transitory computer-readable storage medium configured to include program instructions which, when executed on a processor, enable actions for routing a packet over a network, comprising:
- receiving the packet;
- replicating the packet;
- forwarding the packet to a server in a plurality of servers using a first forwarding mechanism;
- selecting which of at least one probe of a plurality of probes to forward the replicate packet using a second forwarding mechanism and based at least on an application associated with the replicate packet, wherein the plurality of probes comprises two or more security probes that each perform a different security analysis on the replicate packet;
- forwarding the replicate packet to the selected at least one probe using the second forwarding mechanism;
- terminating a connection between the server and a client associated with the packet if a response packet received from at least one probe in the plurality of probes includes a reset command to the server, and
- wherein the second forwarding mechanism further comprising the selecting based on a load-balancing mechanism.

31. The non-transitory computer-readable storage medium of claim 30, wherein receiving the response packet from the at least one probe in the plurality of probes is in response to the replicate packet.

* * * * *